(12) United States Patent
Hales et al.

(10) Patent No.: US 10,679,421 B2
(45) Date of Patent: Jun. 9, 2020

(54) INTERACTIVE SPA

(71) Applicant: Bullfrog International, L.C., Bluffdale, UT (US)

(72) Inventors: Eric Hales, Eagle Mountain, UT (US); Todd Anderson, Lehi, UT (US); Samson Madsen, Draper, UT (US)

(73) Assignee: Bullfrog International, LC, Herriman ( * ) Notice: Subject to any disclaimer, the term of this patent is extended or adjusted under 35 U.S.C. 154(b) by 0 days.

(21) Appl. No.: 16/189,224

(22) Filed: Nov. 13, 2018

(65) Prior Publication Data

US 2020/0150755 A1   May 14, 2020

(51) Int. Cl.
| | |
|---|---|
| *G06T 19/00* | (2011.01) |
| *G06F 3/01* | (2006.01) |
| *A61H 33/00* | (2006.01) |
| *G02B 27/01* | (2006.01) |

(52) U.S. Cl.
CPC ....... *G06T 19/006* (2013.01); *A61H 33/6005* (2013.01); *G02B 27/017* (2013.01); *G06F 3/012* (2013.01)

(58) Field of Classification Search
CPC ..... G06F 3/012; G02B 27/017; G06T 19/006; A61H 33/6005
See application file for complete search history.

(56) References Cited

U.S. PATENT DOCUMENTS

| | | | | |
|---|---|---|---|---|
| 2011/0072367 A1* | 3/2011 | Bauer | ................ | G06F 3/04815 715/757 |
| 2011/0105281 A1* | 5/2011 | Jerichow | .............. | A61B 5/0833 482/54 |
| 2011/0278459 A1* | 11/2011 | Hohl | ........................ | G08B 3/10 250/340 |
| 2016/0374897 A1* | 12/2016 | Carey | ................ | A61H 33/6063 4/568 |

FOREIGN PATENT DOCUMENTS

| | | | | |
|---|---|---|---|---|
| DE | 202004007273 | * | 7/2004 | ............. A63J 25/00 |
| DE | 202006011058 | * | 10/2006 | ............. A61B 5/411 |

OTHER PUBLICATIONS

Neely, Karissa, "Virtual reality comes to the hot tub purchasing expierence", Dec. 7, 2017, https://www.heraldextra.com/business/local/virtual-reality-comes-to-the-hot-tub-purchasing-experience/article_8f28a409-4635-57ae-ab52-2463950a7051.html (Year: 2017).*
S Danielle, "How Bull frog Spas is Using BR to Create the Ultimate Hot Tub Expierence", Aug. 16, 2017, https://medium.com/silicon-slopes/how-bullfrog-spas-is-using-vr-to-create-the-ultimate-hot-tub-experience-ce3384111a5b (Year: 2017).*

* cited by examiner

*Primary Examiner* — Michelle L Sams
(74) *Attorney, Agent, or Firm* — Durham, Jones & Pinegar; Sarah Matthews

(57) ABSTRACT

An interactive spa that may allow users to experience what it would be like to use a fully operational spa. The spa may contain a cutaway, or a void, on one of the sides of the spa (Continued)

to allow users to enter and exit the spa without needing to climb over the sides. The spa may also have windows that allow users to view certain internal aspects of the spa for display purposes. The spa may also utilize one or more virtual reality sensors to allow users to experience, to an extent, what it would be like use an operational spa. The spa may include a monitor stand that may have one or more touch-screen monitors, which may allow users to browse through information about the spa or view the virtual reality content that users are seeing while within the spa.

16 Claims, 7 Drawing Sheets

INTERACTIVE SPA

TECHNICAL FIELD

This disclosure relates generally to interactive cutaway spa models, which may be used for advertisement purposes. More specifically, it relates to display model spas that incorporate various features, including virtual reality technology, in order to allow individuals to interact with the model spas and, to a certain extent, experience and visualize what use of a fully operational spa would be like. The features disclosed herein are numerous in nature and may be employed in various different ways to provide the same or similar interactive results.

SUMMARY

This disclosure, in at least one aspect, relates to the use of a cutaway spa model that allows potential customers to interact with and learn about spa products. More generally, the model utilizes various design features and virtual reality technology to allow users to enter the model spa and experience, to a certain extent, what it would be like to sit in a fully operational spa.

On one of the sides of the spa, it may contain an opening, cutaway, or void in which a vertical cross-section of the wall is removed, which defines an entry walkway for users to easily enter and exit the model spa without needing to climb over the sides of the spa. Windows may be added on opposite sides of the void, or cutaway, which may provide a cross-sectional view into the inside of the spa walls, allowing individuals to see many of the internal aspects of the model, such as the insulation and the frame. Windows may also be added to the newly defined walkway into the model, which may allow individuals to view certain internal aspects of the base of the spa, such as the spa's plumbing system. Adhesive mats may also be placed on the newly defined walkway to provide users with traction while entering and exiting the model spa. Lights may be added to the spa in a variety of locations, such as to any of the aforementioned windows so that the internal aspects of the model may be properly displayed and viewed.

This disclosure also relates to the use of virtual reality technology within the model spa to allow users to interact with it and experience what it would be like to use a fully operational spa. The spa may employ the use of one or more virtual reality sensors in order to map the physical space within the model spa, track the users' movements and perspectives within the spa, and then display to the users what their perspectives would be if they were in a fully operational spa.

The model spa may also incorporate a monitor stand, which may be mounted to or separate from the body of the spa. The monitor stand may contain a touchscreen monitor that may allow users to browse through information about the spa. The monitor may also be used to view the virtual reality content that a user within the spa is seeing.

A new interactive spa is disclosed herein that combines a spa, which may have a cutaway, or voided portion of one or more of the walls and may utilize virtual reality technology. This combination may allow potential customers to enter and exit the spa without having to climb over the sides of the spa, sit in the spa, and experience it in a new, immersive, and interactive way. This combination overcomes the relative difficulty that accompanies allowing numerous potential customers to "try out" a fully functional spa before they purchase one.

There is a plurality of means and methods for fixing and or securing the virtual reality sensor(s) and the monitor stand(s) to the model spa, and multiple variations are disclosed herein. Other aspects, as well as features and advantages of various aspects of the disclosed subject matter will become apparent to one of ordinary skill in the art from the ensuing description, the accompanying drawings, and the appended claims.

DETAILED DESCRIPTION

Figure 1:
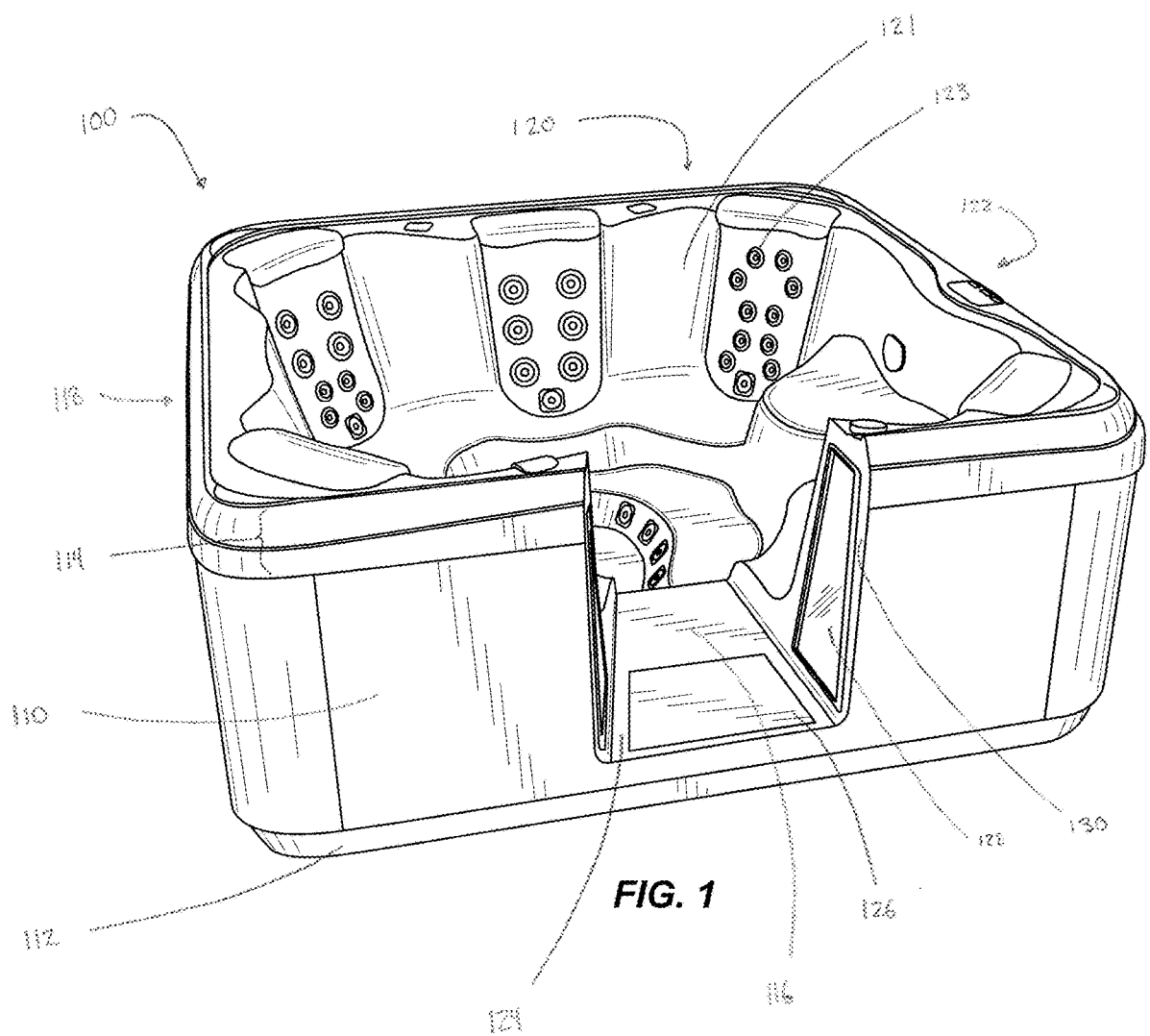
FIG. 1 is a top perspective view of an interactive model spa in which a portion of one of the sides of the spa includes a cutaway, or void.

FIGS. 1-4 illustrate an embodiment of a spa 100. The spa 100 may be in the shape of a square or rectangular prism, however it will be important to note that the spa may be any polygonal shape or circular shape. In this particular embodiment, the spa may contain four outer spa walls. A first spa wall is a planar surface which extends from a base 112 to a top 114 and from a second spa wall 118 to a fourth spa wall 122. The second spa wall 118 and the fourth spa wall 122 are both planar surfaces that extend from the base to the top and from the first wall 110 to a third spa wall 120. The third spa wall 120 is a planar surface that extends from the base to the top and from the second wall 118 to the fourth wall 122.

The base 112 is a horizontal planar cross-section of the lower-most portion of the spa 110 that extends between the four walls 110, 118, 120, and 122. The base 112 constitutes the bottom-most portion of the spa.

Referring to FIG. 1, the spa 100 may contain an inner wall 121, which may define the contours of the tub/bathing area of the spa 100. The inner wall 121 may also define the dimensions of the seats and other features incorporated in the tub/bathing area. FIG. 1 also illustrates that the top 114 is the upper-most portion of the spa 100, which may be positioned above each of the four walls 110, 118, 120, and 122. The top 114 extends between the outer walls 110, 118, 120, 122 to the inner wall 121.

FIG. 1 also demonstrates that the spa 100 may include advanced interchangeable jet modules 123, which are included and described in U.S. Pat. No. 7,908,684, which is incorporated herein by reference in its entirety. Additionally, a controller 125, which may be a smart controller, may be positioned on, at or toward the top 114 of the spa 100.

The spa 100, may vary in size. For instance, the length and width of the spa, as defined by the four walls 110, 118, 120, 122, may be anywhere from 4 feet to 16 feet. And the height of the spa—which is equal to the height of the base 112 plus the height of the walls, 110, 118, 120, 122, plus the height of the top 114—may vary anywhere from 3 feet to 6 feet. These dimensions may vary depending on the shape of the spa. For example, a cylindrical shaped spa may be defined by other measurements; i.e. a cylindrical (or circular cross-sectional) shaped spa may be defined by having a diameter of anywhere from 4 feet to 16 feet.

Figure 2:
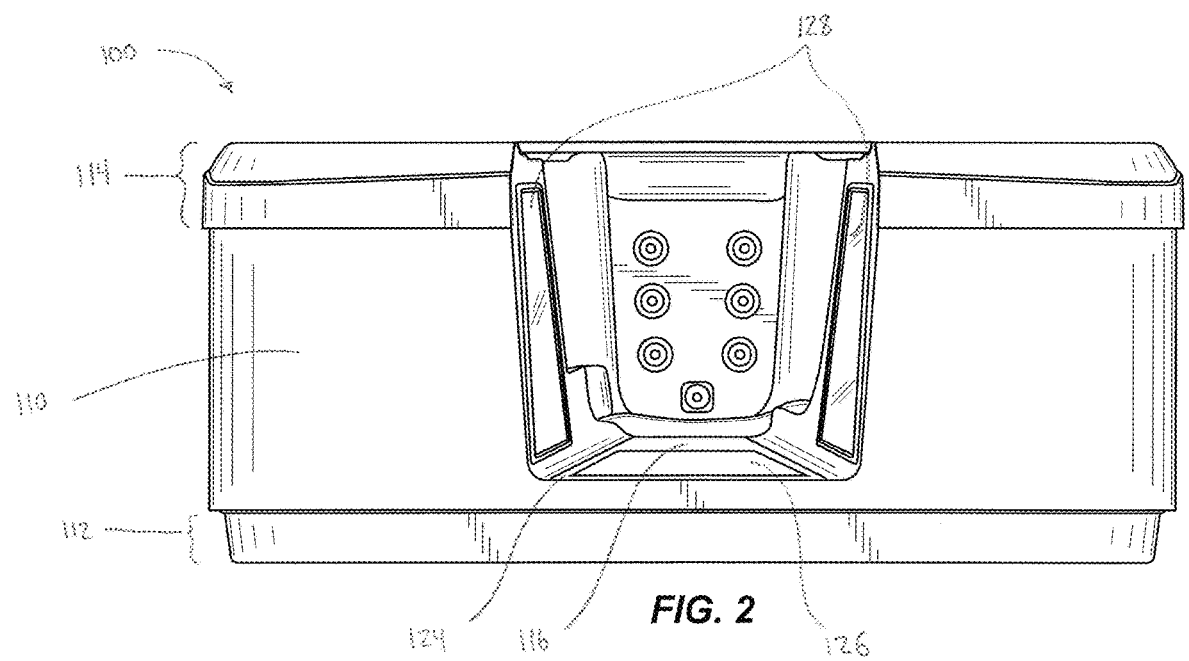
FIG. 2 is a front view of the model spa of FIG. 1 in which a portion of one of the sides of the spa includes a cutaway, or void.

Referring to FIGS. 1 and 2, one or more of the walls 110, 118, 120, 122 of the spa may contain a cutaway 116, or a void or an opening, in which a vertical cross sectional portion of one of the spa walls 110, 118, 120, 122 has been removed and thereby defines an opening into the tub/bathing area of the spa. In height, the cutaway 116 may extend from the top 114 to a height of two feet above the bottom of the base 112 or to the bottom of the base 112 or anywhere in between. In length, the cutaway 116 may extend from 18 inches long to the entire length of the spa 100 (i.e. the cutaway 116 may extend the entire distance between opposite walls, such as extending from the second wall 118 to the fourth wall 122) so that the cutaway 116 may be as tall and wide as an entire wall of the spa 100. In width, the cutaway 116 may also extend from the outside of one of the spa walls 110, 118, 120, 122 to the inner wall 121.

Based on the range of these dimensions, the size of the cutaway 116 may vary from short, narrow, and thin to tall, wide, and deep depending on the dimensions of the spa walls 110, 118, 120, 122. For example, the dimensions of the cutaway may contain the following dimensions; in height, anywhere from two feet tall to the entire height of the spa walls 110, 118, 120, 122; in length, anywhere from two feet wide to the entire length of the spa walls 110, 118, 120, 122; and in width, any width from two feet to the entire distance from the outside of one of the spa walls 110, 118, 120, 122 to the inner wall 121. In this particular embodiment, the cutaway 116 may be approximately two feet wide, two feet tall, and extend from the wall 110 to the inner wall 121. It is important to note that any dimensions are contemplated to provide a cutaway sufficient for a user to pass through from inside and outside of the spa.

The cutaway 116 may define a walkway 124, or a platform, which is a planar surface that may be positioned at some height between the height of the base 112 and the height of the top 114. The walkway 124 may allow individuals to enter and exit the spa without needing to climb over the sides or walls of the model 100. The walkway may include a passageway or entrance into the spa.

The walkway 124 may contain a window 126, or a plurality of windows, which may allow individuals to see certain interior aspects of the bottom portion of the spa 100 (i.e. the spa's plumbing system and insulation). The window 126, or windows, on the walkway 124, may span the entire surface of the walkway 124 or merely a portion of it. The walkway 124 may also contain adhesive mats in order to provide traction for individuals who are using the walkway 124 to step into or out of the spa 100.

The cutaway 116, or cross-sectional void, may also define new internal walls 130. These internal walls may extend from the lower-most portion of the cutaway 116 to the upper-most portion of the cutaway 116 and from the outside of one of the spa walls 110, 118, 120, 122 to the inner wall 121.

Depending on the dimensions of the cutaway 116, the internal walls 130 may be non-perpendicular or parallel to one another and may be mirror-images of one another. The internal walls 130 may also contain a side window 128, or a plurality of windows, which may allow individuals to see a cross-sectional view of certain interior aspects of the walls of the model 100 (i.e. the insulation and the spa's frame structure). The side window 128, or windows on the internal walls 130, may span the entire surface of the internal walls 130 or merely a portion of the internal walls 130.

Lights may be added to the spa in any of a plurality of positions. One positioning of a light may include within or behind both the window(s) 126 on the walkway 124 and the side window(s) 128 on the internal walls 130 in order to provide lighting for individuals to properly see the internal aspects of the spa 100.

Figure 3:
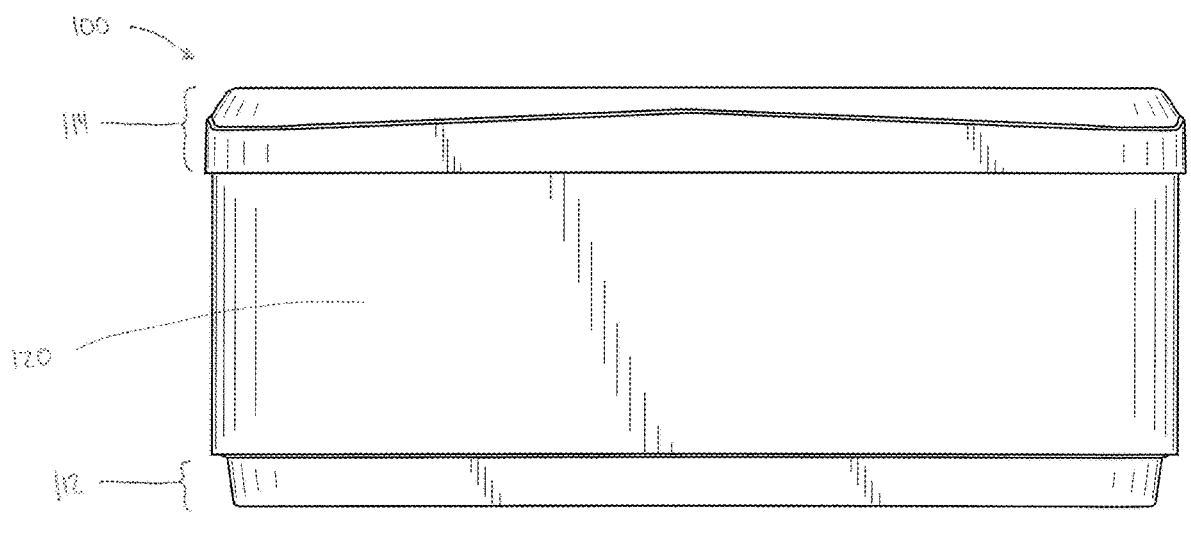
FIG. 3 is a back view of the model spa of FIG. 1.

Referring to FIG. 3, a back portion of the spa 100 is illustrated with the third wall 120 intersecting the base 112 and the top 114. The other spa walls 118, 122 may be substantially similar to the third wall 120.

Figure 4:
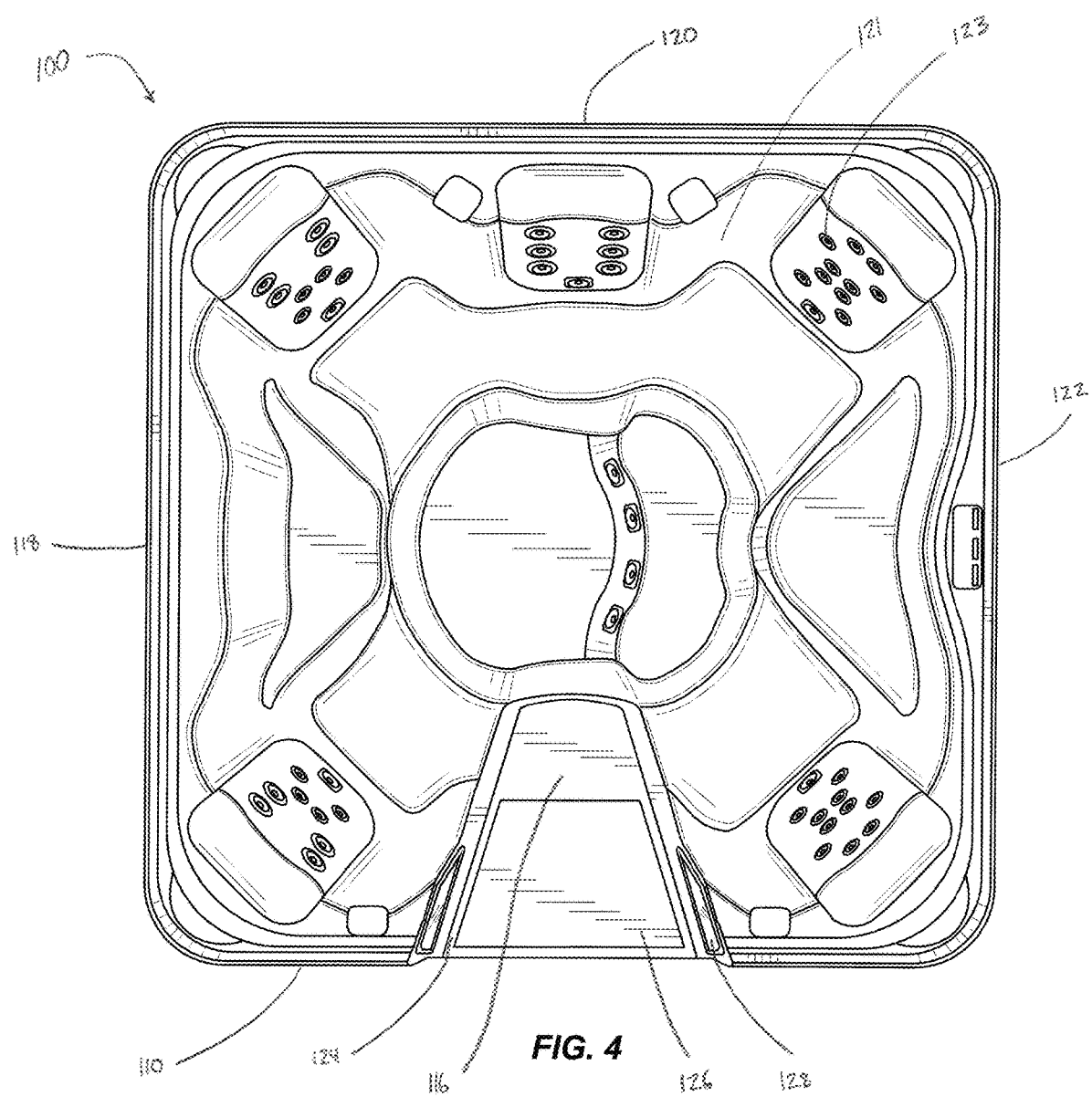
FIG. 4 is a top view of the model spa of FIG. 1.

Referring to FIG. 4, a top view of the spa 100 illustrates the jet modules 123, the contours of the inner wall 121, and the seats of the spa that a user may interface with as well as the controller 125 that a user can use to control the jet modules 123, the heat, the music, the lights and other functions of the spa 100.

Figure 5:
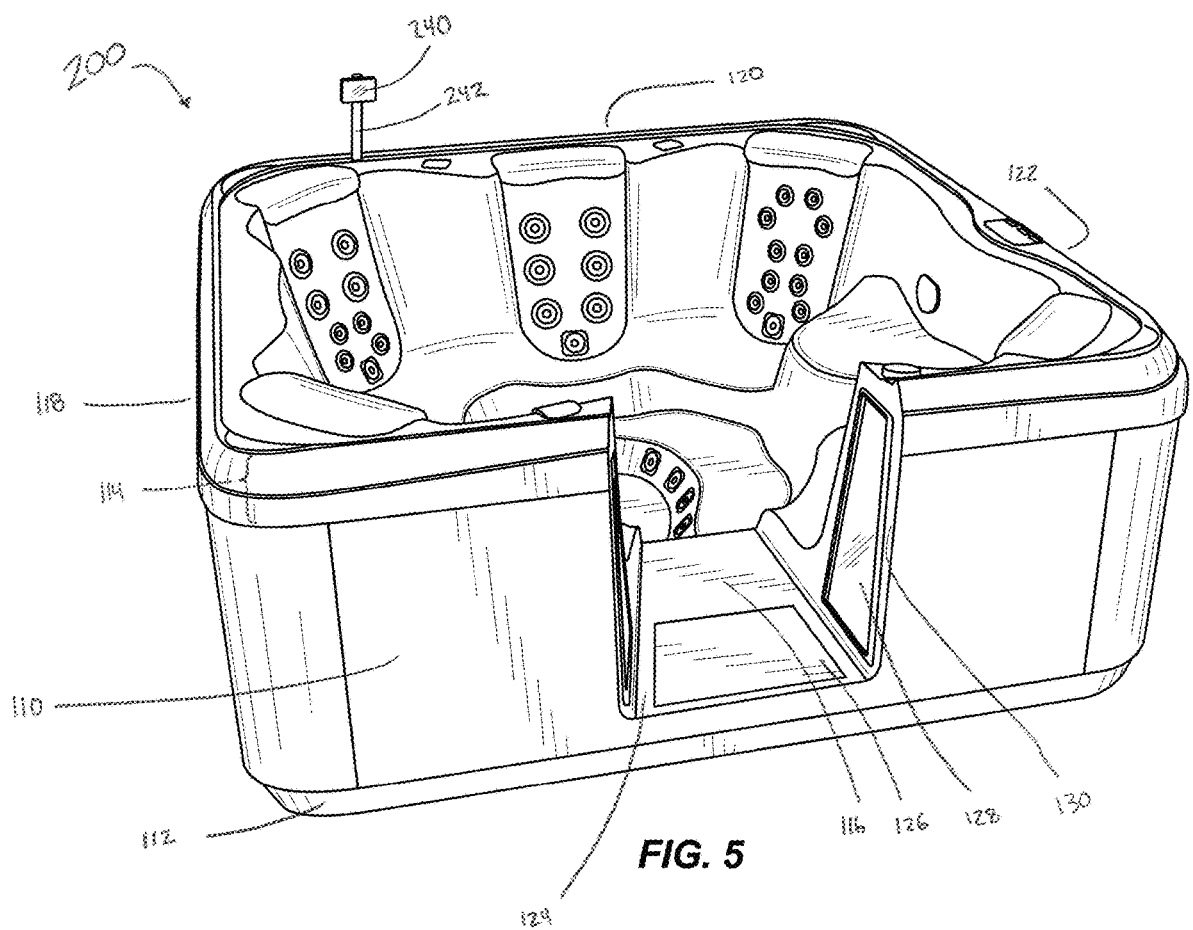
FIG. 5 is a top perspective view of a spa in which a portion of one of the sides of the spa includes a cutaway, or void, and there is a virtual reality sensor that is fixed to the spa.

FIG. 5 illustrates an embodiment of a spa 200 which may be substantially similar to spa 100. The spa 200 may be combined with various technological elements to increase its interactivity. More specifically, a virtual reality sensor 240, or a plurality of virtual reality sensors, may be utilized in combination with the spa 200. The sensor 240 may be positioned above the top 114 of the spa 200, and may be located along any side of the spa, or near one of the corners of the spa 200. The sensor 240 may be positioned, for example, above the corner of the spa 200 where the second wall 118 and the third wall 120 meet. The sensor 240 may be reversibly or irreversibly fastened or otherwise attached to the model 200 by attaching the sensor 240 to the top of a pole 242, or a tripod or mount or stand, which may be fastened to the model 200. The sensor 240 may also be positioned above the top 114 by other, separate means. This may be achieved, for example, by attaching the sensor 240 to a stand-alone tripod, stand, or mount that may be placed near the spa 200. The sensor 240 may be positioned so that it faces the center of the spa 200 or in whichever direction maximizes the functionality of the sensor 240.

A plurality of virtual reality sensors may be utilized in combination with the spa 200 in order to improve the virtual reality experience.

The sensor 240 may enable individuals to interact more realistically with the model 200 and, to an extent, to experience what it would be like to use a fully functional version of the spa. The sensor 240 may aid in constructing and presenting an immersive virtual experience in which the spa is portrayed to users on a scale that appears realistic to the user. The sensor 240 may do so by tracking a user's location and perspective while within the model 200 and then display to the user what his or her perspective would as if he or she were actually in a fully operational spa.

Figure 6:
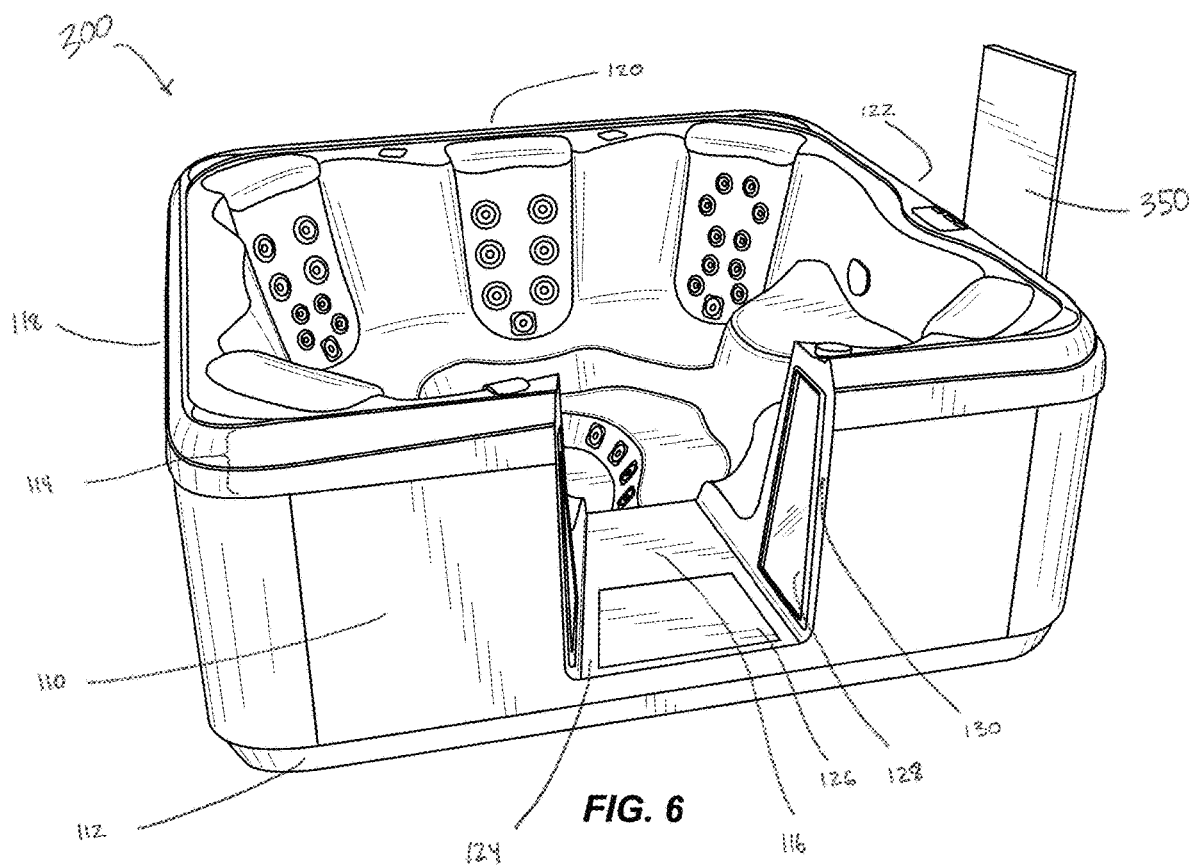
FIG. 6 is a top perspective view of a spa in a portion of one of the sides of the spa includes a cutaway, or void, and there is a monitor stand on a side of the spa.
Figure 7:
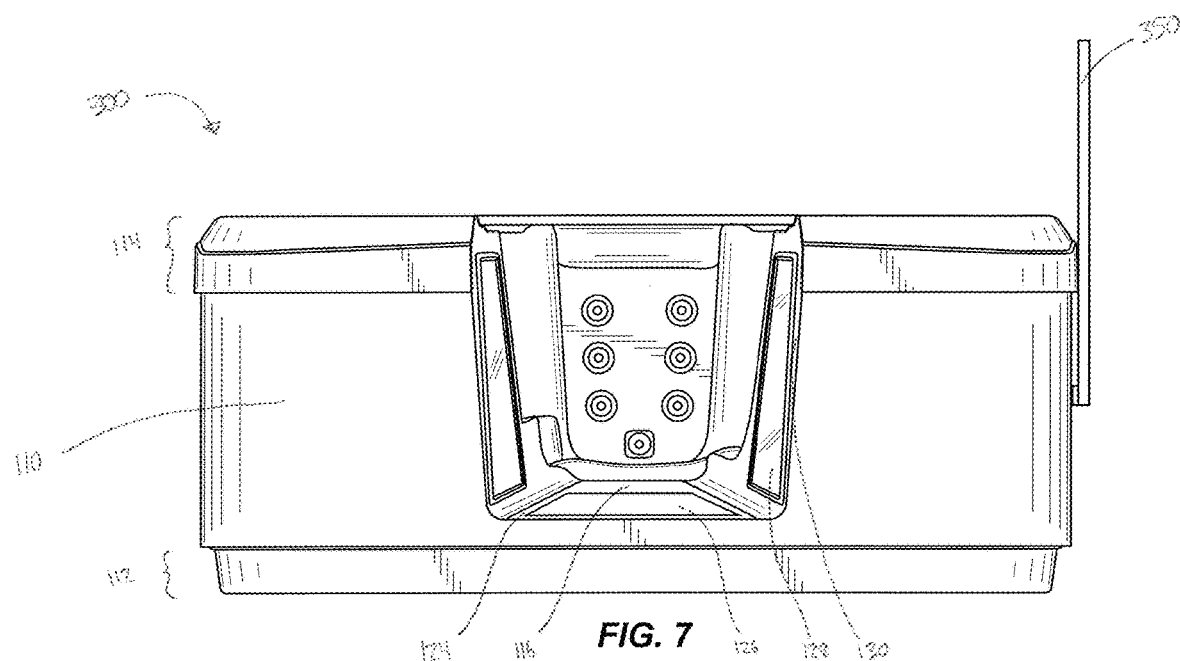
FIG. 7 is a side view of the spa of FIG. 6.
Figure 8:
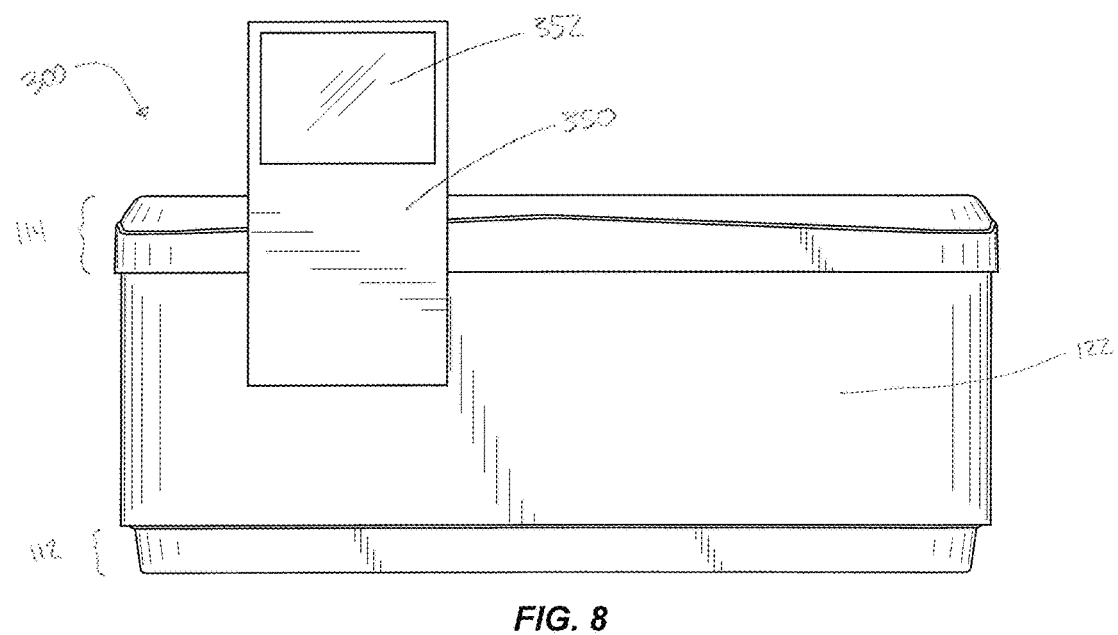
FIG. 8 is a side view of the spa of FIG. 6.

FIGS. 6-8 illustrate an embodiment of a spa 300 which may be substantially similar to spa 100. The spa 300 demonstrates how an embodiment like spa 100 may be combined with various technological elements in order to become more interactive. More specifically, a monitor stand 350, or a plurality of monitor stands, may be utilized in combination with the spa 300. The monitor stand may be reversibly or irreversibly fastened, attached, or mounted to any of the walls of the model, for example on the fourth wall 122 near the corner where the fourth wall 122 meets the first wall 110. The stand 350 may be mounted to a cabinet that has been mounted to any of the walls of the spa 300.

The stand 350 may also be separate and apart from the spa 300 and may be placed near the spa 300. The stand 350 may be positioned at a height suitable for comfortable viewing. For example, the upper portion of the stand 350 may extend up above the height of the top 114 so that individuals may view it comfortably from a standing position.

FIG. 7 illustrates a front portion of the spa 300 with the first wall 110 intersecting the base 112 and the top 114, and the cutaway 116 incorporated into the first wall 110. FIG. 7 illustrates that the monitor stand 350 may be reversibly or irreversible mounted to one of the spa walls, which in this particular embodiment happens to be the fourth wall 122. The stand 350 may also be integrated with one of the walls 110, 118, 120, 122 so that it may be inset into the wall or protrude from the wall or the top 114.

FIG. 8 illustrates a side portion of the spa 300 with the fourth wall intersecting the base 112 and the top 114. FIG. 8 demonstrates that the monitor stand 350, may be fastened to the fourth wall 122. In a similar manner, a monitor stand 350, or a plurality of monitor stands, may be fastened to any of the other walls 110, 118, 120, 122.

FIG. 8 also illustrates that the stand 350 may contain a monitor 352, or a plurality of monitors. The monitor 352, or plurality of monitors, may include interactive touch-screen features that allow users to access and browse through information about the spa 300. The monitor stand 350 and the monitor 352 may also include features that allow the monitor 352 to display any virtual reality content that users may be seeing while using the virtual reality technology within the spa 300. The monitor stand 350 and the monitor 352 may be one and the same or may be separate. The monitor 352 may be reversibly or irreversibly fastened to the monitor stand 350.

The monitor stand 350 may be placed so that the monitor 352 faces any direction that may allow individuals to view content on the monitor 352.

Figure 9:
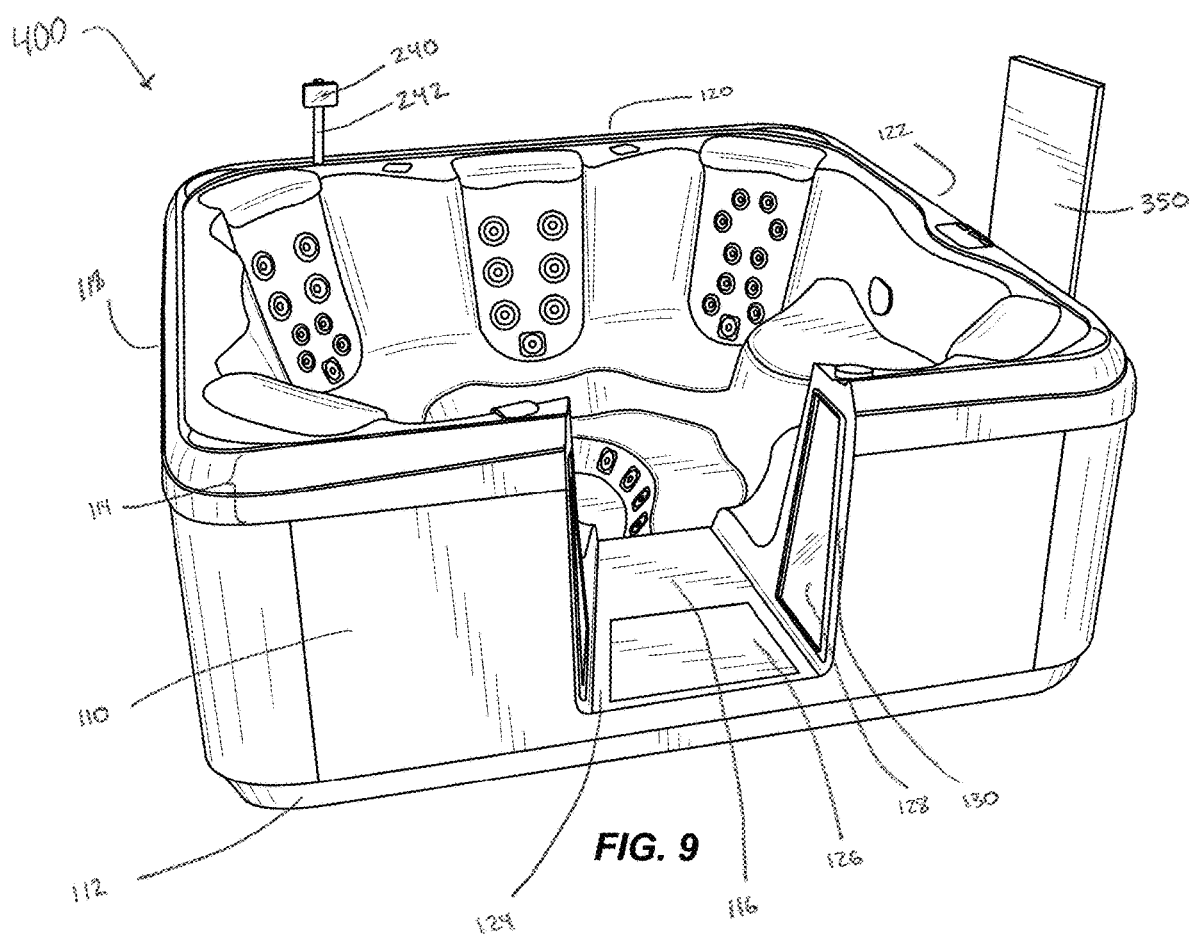
FIG. 9 is a top perspective view of a spa in which a portion of one of the sides of the spa includes a cutaway, or void, a virtual reality sensor that is fixed to the spa, and a monitor stand on a side of the spa.

FIG. 9 illustrates an embodiment of a spa 400 which may be substantially similar to spa 100, spa 200, and spa 300. The spa 400 demonstrates that various technological elements may be utilized in combination with the spa 400 in order to increase its interactivity. More specifically, the spa may utilize a sensor 240, or a plurality of sensors, as well as a monitor stand 350, or a plurality of monitor stands, and a monitor 352, or a plurality of monitors.

In addition to the virtual reality sensor 240, a plurality of virtual reality sensors may be utilized in combination with the spa 400 in order to improve the quality of the virtual reality experience for users. These additional sensors may be fastened to the spa 400 in various locations as described above. Additional sensor(s) may also be reversibly or irreversibly fastened to the monitor stand 350 so that the sensor(s) are facing the spa 400, or in whichever direction maximizes the functionality of the sensor(s).

Although the foregoing disclosure provides many specifics, these should not be construed as limiting the scope any of the ensuing claims. Other embodiments may be devised which do not depart from the scopes of the claims. Features from different embodiments may be employed separately or in combination. Accordingly, all additions, deletions and modifications to the disclosed subject matter that fall within the scopes of the claims are to be embraced thereby. The scope of each claim is indicated and limited only by its plain language and the full scope of available legal equivalents to its elements.

What is claimed:

1. An interactive spa comprising:
    a spa comprising:
        a base;
        at least one side wall;
        a top;
        a cutaway positioned on the at least one side wall, wherein the cutaway extends from the base to the top and passes entirely through the at least one side wall, wherein the cutaway defines a first internal wall, and wherein the first internal wall comprises at least one side window for viewing a cross-section of the at least one side wall, and at least one light proximal to the at least one side window within the first internal wall; and
        a monitor stand mounted to the spa having a touchscreen monitor attached thereto, the touchscreen monitor displaying information about the spa and virtual reality content seen by a spa user.

2. The interactive spa of claim 1, wherein the at least one side wall comprises four side walls which form a rectangular prism.

3. The interactive spa of claim 1 comprising at least one sensor.

4. The interactive spa of claim 3, wherein the at least one sensor is configured to sense a user within the body of the spa.

5. The interactive spa of claim 4, wherein the at least one sensor comprises a single sensor.

6. The interactive spa of claim 5, wherein the sensor is positioned on a stand or a tripod that is separate from the spa.

7. The interactive spa of claim 5, wherein the sensor is fixed to a position toward the top of the spa.

8. The interactive spa of claim 3 wherein the touchscreen monitor is in communication with the at least one sensor for viewing a user's interaction with the spa via at the least one sensor.

9. An interactive spa comprising:
    a spa comprising:
        a bottom portion;
        at least one side wall;
        a top portion; and
        a void extending into a portion of the at least one side wall, the void defining a permanently open walkway comprising a window for viewing interior aspects of the bottom portion of the spa;
    at least one virtual reality sensor for sensing a user and tracking a perspective of the user within the spa, the at least one virtual reality sensor reversibly fixed to a position on the top portion of the spa;
    at least one monitor mounted proximal to the spa, the at least one monitor in communication with the at least one virtual reality sensor to display on the monitor the perspective of the user in a virtual fully operational spa.

10. The interactive spa of claim 9, wherein the at least one side wall comprises four side walls which form a rectangular prism.

11. The interactive spa of claim 9, wherein the at least one virtual reality sensor comprises a single sensor.

12. The interactive spa of claim 9 wherein the void extends from the bottom portion to the top portion.

13. A method of using an interactive spa comprising:
    obtaining a spa wherein the spa comprises:
        a base;
        at least one side wall;
        a top; and a cutaway positioned on the at least one side wall forming a permanently open walkway, and at least one window for viewing at least a portion of a cross section of the cutaway;
positioning a virtual reality headset on a user;
positioning the user within the spa; and
viewing virtual reality content via a visual element, wherein the visual element comprises a touch screen and wherein the touch screen is in communication with the virtual reality headset;
displaying, for the user to select, an option for displaying the virtual reality content on the touch screen, and an option for displaying interactive information about the spa on the touch screen.

14. The method of claim 13, wherein the spa is utilized in combination with at least one sensor, wherein the at least one sensor interfaces with the visual element to display the virtual reality content.

15. The method of claim 13, wherein viewing the virtual reality content via a visual element comprises the user viewing the spa in a virtual reality environment via the virtual reality headset.

16. The method of claim 13, wherein viewing the virtual reality content via a visual element comprises at least one third party spectator viewing the virtual reality content from a visual element that is separate from the virtual reality headset of the user.

* * * * *